US008382189B2

(12) United States Patent
Li et al.

(10) Patent No.: US 8,382,189 B2
(45) Date of Patent: Feb. 26, 2013

(54) MOLDED VANITY ASSEMBLY AND METHOD

(75) Inventors: Chi Li, Farmington Hills, MI (US); John Andrew Stakoe, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 12/898,172

(22) Filed: Oct. 5, 2010

(65) Prior Publication Data
US 2012/0080903 A1   Apr. 5, 2012

(51) Int. Cl.
B60J 3/00   (2006.01)
(52) U.S. Cl. ...................................... 296/97.5
(58) Field of Classification Search .............. 296/97.5, 296/97.1, 97.11, 97.12, 97.2, 97.8, 97.9; 362/135, 137, 140, 142, 144, 492, 141
See application file for complete search history.

(56) References Cited

U.S. PATENT DOCUMENTS

| | | | |
|---|---|---|---|
| 3,843,236 A | 10/1974 | Kurz, Jr. | |
| 4,479,172 A | 10/1984 | Connor | |
| 4,988,140 A * | 1/1991 | Van Order | 362/492 |
| 5,005,895 A * | 4/1991 | Muyres et al. | 296/97.8 |
| 5,007,532 A * | 4/1991 | Binish | 296/97.1 |
| 5,205,635 A * | 4/1993 | Van Order et al. | 362/492 |
| 5,230,546 A * | 7/1993 | Smith et al. | 296/97.1 |
| 5,338,082 A * | 8/1994 | Miller | 296/97.1 |
| 5,428,513 A * | 6/1995 | Hiemstra et al. | 362/143 |
| 5,473,516 A * | 12/1995 | Van Order et al. | 362/492 |
| 5,560,704 A * | 10/1996 | Hiemstra et al. | 362/143 |
| 6,254,168 B1 * | 7/2001 | Crotty, III | 296/97.2 |
| 6,435,593 B2 * | 8/2002 | Welter | 296/97.5 |
| 6,497,504 B2 * | 12/2002 | Macher et al. | 362/492 |
| 2006/0181893 A1 * | 8/2006 | Fernandez et al. | 362/494 |
| 2006/0198123 A1 | 9/2006 | Radu | |
| 2006/0261627 A1 * | 11/2006 | Hamelink et al. | 296/97.1 |
| 2007/0187976 A1 * | 8/2007 | Hamelink et al. | 296/97.1 |
| 2009/0218845 A1 * | 9/2009 | Rockafellow | 296/97.5 |
| 2010/0264684 A1 * | 10/2010 | Kring et al. | 296/97.5 |
| 2011/0109117 A1 * | 5/2011 | Marcus et al. | 296/97.5 |

FOREIGN PATENT DOCUMENTS
EP   0745498   12/1996

* cited by examiner

Primary Examiner — Kiran B Patel
(74) Attorney, Agent, or Firm — Vichit Chea; Price Heneveld LLP

(57) ABSTRACT

A vanity mirror and light assembly is provided for use on a vehicle visor. The vanity assembly includes a clear frame molded to a reflective film to define a reflector portion and a partially transmissive portion. The assembly also includes a lighting device located behind the partially transmissive portion of the reflective film to provide a vanity light passing through the partially transmissive portion. A method of forming the vanity assembly in a mold is also provided.

10 Claims, 4 Drawing Sheets

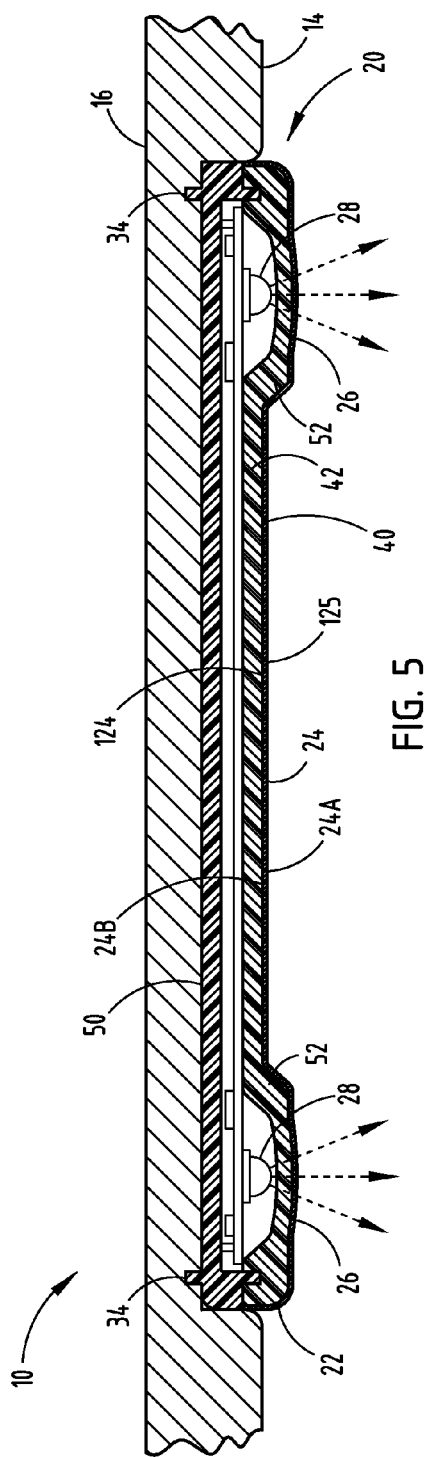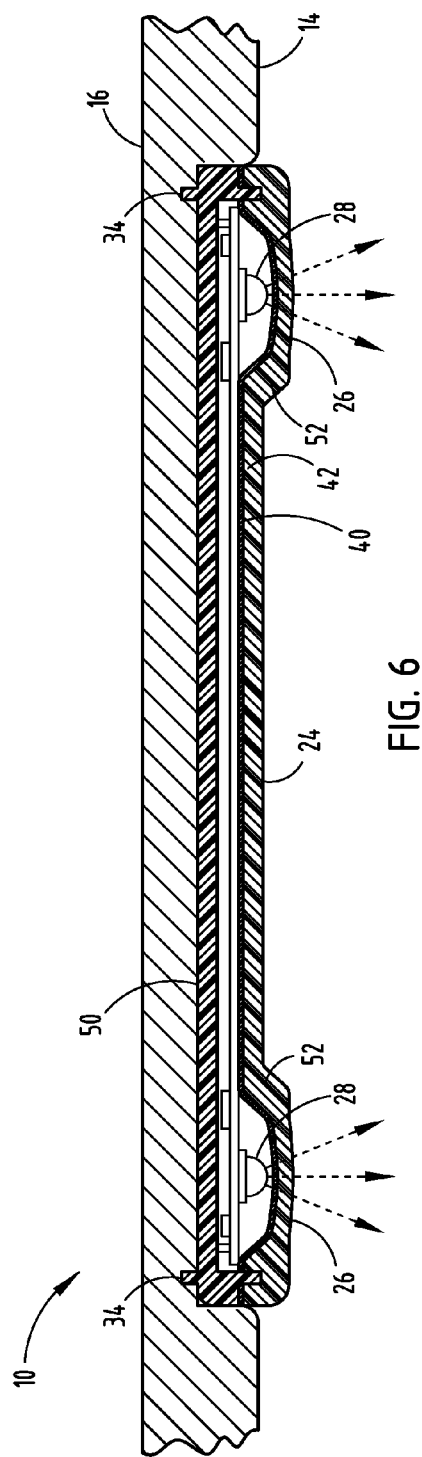

MOLDED VANITY ASSEMBLY AND METHOD

FIELD OF THE INVENTION

The present invention generally relates to automotive vanity mirrors, and more particularly relates to a molded vanity mirror and light assembly such as the type typically assembled onto a vehicle visor.

BACKGROUND OF THE INVENTION

Automotive, vehicles are commonly equipped with a pair of sun visors generally connected to the roof or headliner forward of the driver and front passenger seats. Each visor may be actuatable between stowed and use positions to provide shade from sunlight. The conventional visor typically includes a vanity mirror and light assembly installed on one side of the visor body. The vanity mirror and light assembly typically has a mirror and one or more vanity lights to provide local lighting sufficient to enable a user to view an image in the mirror, particularly when ambient lighting conditions are poor. The vanity light(s) is activated on typically when the visor is in the use position and a lid of the vanity assembly is opened or uncovered.

The conventional vanity mirror has a plastic frame typically made of polypropylene (PP) or polycarbonate ABS (PCABS) which houses a glass mirror and an optical lens made of polycarbonate (PC) disposed in front of a light source. The conventional vanity assembly has several components including the frame, the glass mirror, and one or more lenses and light sources which generally must be assembled to form the vanity assembly. It is desirable to provide for an aesthetically pleasing vanity assembly with a reduced number of components and an easy to manufacture design.

SUMMARY OF THE INVENTION

According to one aspect of the present invention, a vanity assembly is provided. The vanity assembly includes a frame and a reflective film molded to the frame to define a reflector portion and a partially transmissive portion. The vanity assembly further includes a lighting device located behind the partially transmissive portion of the reflective film to provide vanity lighting passing through the partially transmissive portion.

According to another aspect of the present invention, a vehicle visor is provided. The visor includes a visor body having a first side and a second side. The visor also includes a vanity frame assembled on, the first side of the visor body and a reflective film molded to the vanity frame to define a reflector portion and a partially transmissive portion. The visor further includes a lighting device located behind the partially transmissive portion of the reflective film to provide vanity lighting passing through the partially transmissive portion.

According to a further aspect of the present invention, a method of manufacturing a vanity assembly is provided. The method includes the steps of providing a reflective film that is partially light transmissive and molding a frame to the reflective film. The method also includes the step of installing a lighting device behind a lighting portion of the reflective film such that light emitted by the lighting device passes through the lighting portion and a reflective portion of the reflective film provides a mirror.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 5 is a cross-sectional view taken through line V-V of FIG. 3 further illustrating the vanity assembly;

FIG. 6 is a cross-sectional view of a vanity assembly having the reflective film rearward of the frame, according to an alternate embodiment;

DETAILED DESCRIPTION OF PREFERRED EMBODIMENTS

Figure 2:
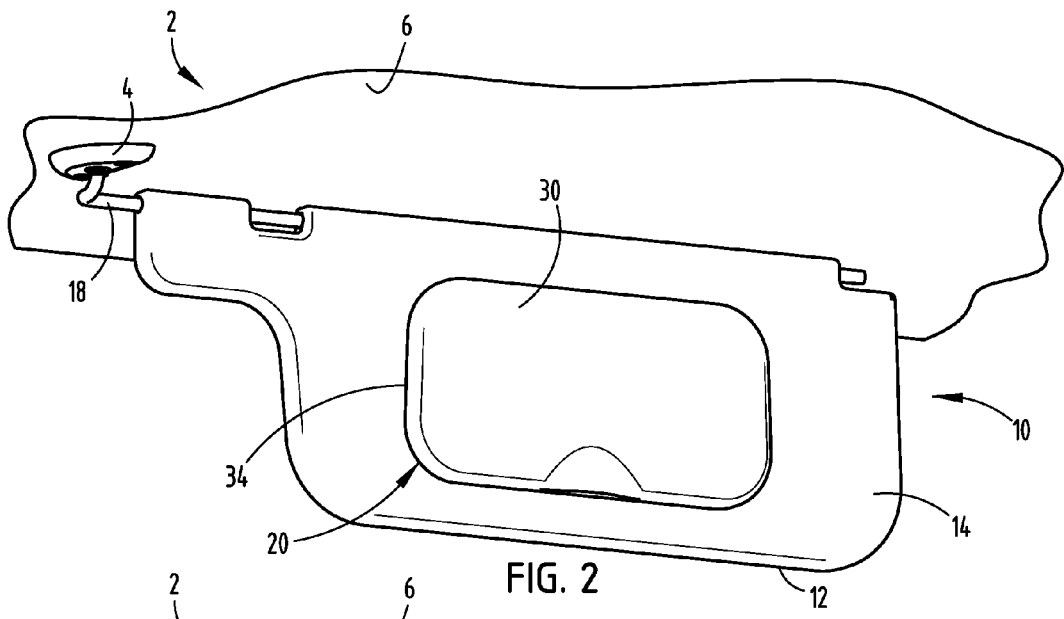
FIG. 2 is a perspective view of the sun visor in the downward use position with the vanity assembly lid in the covered position.
Figure 3:
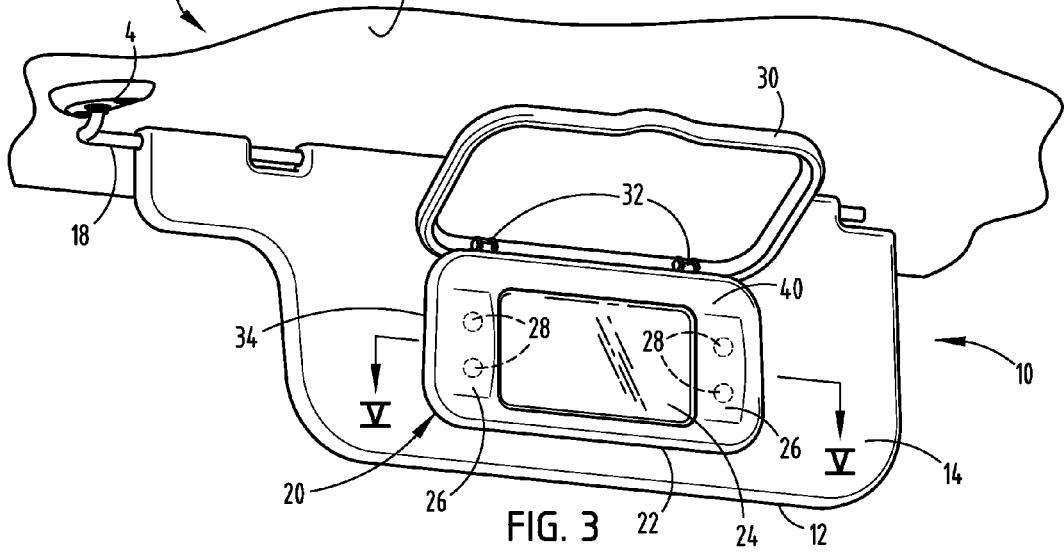
FIG. 3 is a perspective view of the sun visor in the downward use position with the vanity lid in the open uncovered position.

For purposes of description herein, the terms "upper," "lower," "right," "left," "rear," "front," "vertical," "horizontal," and derivatives thereof shall relate to the visor and vanity mirror and lighting assembly as oriented in FIGS. 2 and 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
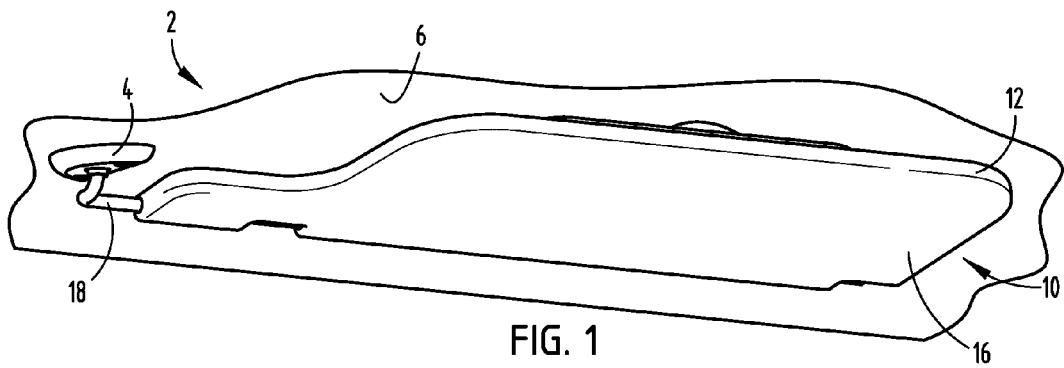
FIG. 1 is a perspective view of a sun visor in a stowed position in a vehicle and having a vanity assembly, according to one embodiment.

Referring to FIGS. 1-5, a vehicle sun visor 10 is generally shown having a vanity mirror and light assembly 20, also referred to herein as a vanity assembly, providing a reflective mirror and lighting, according to a first embodiment. The vehicle sun visor 10 is shown installed in a passenger compartment of a vehicle 2 generally in a region forward of a front passenger seat of the vehicle 2. The visor 10 has a visor body 12 with a connector 18 that connects to a roof mounted bracket 4 generally in the headliner 6 or roof of the vehicle 2. It should be appreciated that one or more sun visors 10 may be located at any of a number of locations on the vehicle 2 and may be employed on any of a number of types of vehicles to provide sunshade in various positions including blocking light from the front windshield or from a side window which may be achieved by pivoting the visor body about connector 18. The sun visor 10 is designed to be tilted upright to a generally horizontal stowed position as shown in FIG. 1, or may pivot downward to a generally vertical deployed use position as shown in FIGS. 2 and 3.

The vehicle sun visor 10 includes a visor body 12 having a conventional visor shape with a first or front side 14, a second or rear side 16 generally parallel to and opposite of first side 14, and a peripheral edge connecting the first side 14 to the second side 16. The visor body 12 may be made of conventional visor materials including, but not limited to, polyurethane and fabric. The connector 18 extends from the visor body 12 and connects the visor 10 to the roof mounted bracket 4 and allows the visor body 12 to be pivoted between the stowed position in FIG. 1 and downward use positions of FIGS. 2 and 3 and also to be rotated about ninety degrees (90°) from a position generally in front of the vehicle front windshield and a position generally in front of a side window of the vehicle 2.

The vanity mirror and light-assembly 20 includes a molded base 22 having a vanity mirror 24 and one or more vanity lights 26 shown in FIG. 3 as first and second vanity lights in one, embodiment on opposite left and right sides of the mirror 24 for providing light illumination on opposite left and right sides of the mirror 24. The vanity assembly 20 also includes a vanity lid 30 pivotally connected to the top edge of the molded base 22 via pivot connectors 32 such that the lid 30 is pivotable between a covered position shown in FIG. 2 which covers the mirror 24 and vanity lights 26 and an uncovered position shown in FIG. 3 which exposes the mirror 24 and vanity lights 26. The vanity lid 30 may be coupled to switch circuitry which turns the vanity lights 26 on when the vanity lid 30 is opened and turns the vanity lights 26 off when the vanity lid 30 is closed as should be apparent to one skilled in the art. The vanity lights 26 provide light illumination to a passenger in the vehicle 2 when the vanity lid 30 is in the open uncovered position.

The vanity assembly 20 has one or more vanity light portions 26, each of which has at least one lighting device or source 28 such as one or more light emitting diode (LEDs), according to one embodiment that provides vanity lighting for use with the vanity mirror 24. In the embodiment shown, each light portion has two LEDs 28; however, one or more light sources may be employed. According to another embodiment, the lighting devices 28 may employ incandescent bulb(s). In the embodiment shown, two light portions 26 are provided in the molded base 22; however, one or more alternative lighting portions may be employed in various locations, sizes and shapes.

Figure 4:
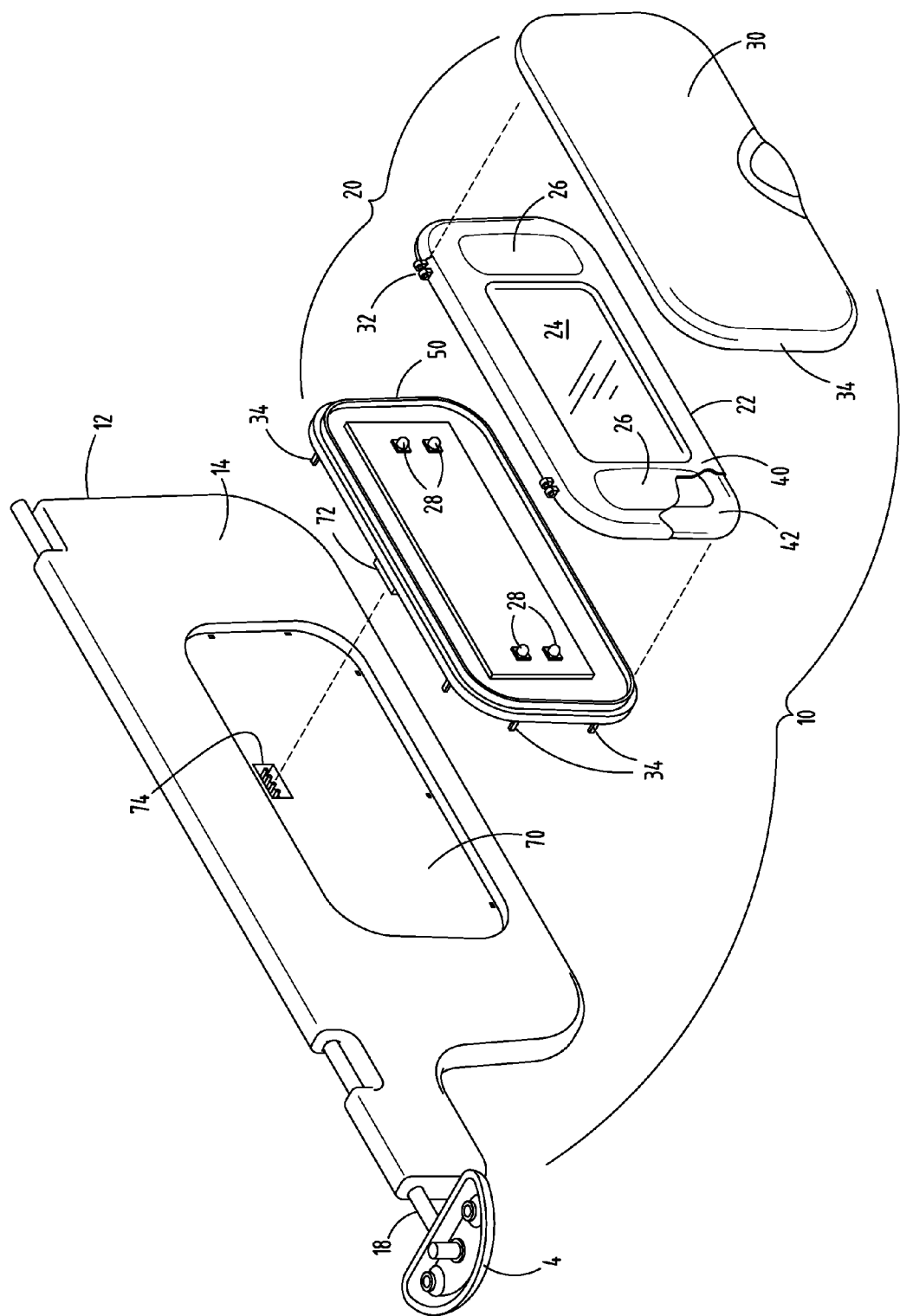
FIG. 4 is an exploded assembly view of the visor and vanity assembly shown in FIG. 2.

Referring to FIG. 4, the vanity assembly 20 and its assembly onto the visor 10 is further illustrated. The vanity assembly 20 is shown having molded base 22 which is pivotally connected to lid 30 via connectors 32 and is assembled onto a rear base plate 50. The assembly of molded base 22 and base plate 50 may be achieved by snapping the frame 42 of molded base 22 onto the base plate 50 via a slot formed in the frame that captures a rim on the back plate 50. The back plate 50 is shown having lighting devices or sources 28 and further includes electrical circuitry including switching circuitry as should be evident to those in the art. The light sources 28 align with the lighting portions 26 in the molded base 22 to provide forward facing light illumination passing through the lighting portions 26 of the molded base 22. The back plate 50 is assembled into a cutout opening 70 provided in the front side 14 of visor 10. A plurality of tabs 34 extending rearward from base plate 50 may help align and fasten or snap the back plate 50 to the visor 10 within opening 70. Additionally, the visor 10 has an electrical connector 74 that matingly connects to electrical connector 72 on the back plate 50 to complete the electrical circuitry for power supplied to the lighting devices 28.

Referring to FIG. 5, the vanity assembly 20 assembled onto the visor 10 is further illustrated, according to one embodiment. In this embodiment, the molded base 22 of vanity assembly 20 is formed having a frame 42 molded to a reflective film 40 such that the reflective film 40 defines a mirror or reflective portion 24 and one or more partially transmissive lighting portions 26. In this embodiment, the frame 42 is formed rearward of the reflective film 40 such that the reflective film 40 is at the front of the molded base 22. The frame 42 may include a clear light transmissive material that allows light to transmit therethrough. According to one embodiment, the clear light transmissive material of frame 42 is a optically clear molded plastic such as polycarbonate (PC) or polymethylmethacrylate (PMMA). One or more lighting devices 28 are located behind the partially transmissive lighting portion 26 of the reflective film 42 to provide vanity lighting passing through the partially transmissive lighting portion 26 of the reflected film 42. As a result, lighting is made available to a user when viewing the vanity mirror portion 24.

It should be appreciated that, in this embodiment, the light generated by each lighting device 28 passes through the clear light transmissive material of the frame 42 and through the partially transmissive lighting portion 26 of the reflective film 40. A rib 52 generally defines the outer perimeter of each lighting portion 26 and separates each lighting portion 26 from the mirror portion 24. The rib 52 helps to direct the light within the lighting portion 26 to prevent light from being emitted through the mirror portion 24. The rib 52 may be formed by providing the mirror and light portions with a depressed cavity on either or both the front and rear sides of the base 22 such that an enlarged thickness portion of the frame 42 forms the rib 52.

The reflective film 40 may include a polyester film 124 with a metallic coating 125. According to one example, the reflective film 40 may be a multi-layer polyester-based film with each side having a smooth, glossy surface. One example of a commercially available reflective film 40 is made available by 3M as Vikuiti™ Dual Brightness Enhancement Film-Polarizer, 92 micron DBEF-Q. The aforementioned DBEF-Q film is a multi-layer reflective polarized film sold in a roll format. The reflective film 40 is reflective on the front side 24A and is a partially transmissive to light directed from the back side 24B toward the front side 24A. Thus, the reflective film 40 provides a reflective mirror surface and, when light is illuminated from the backside, the reflective film 40 passes at least a portion of the light therethrough sufficient to serve as vanity lighting. The reflective film 40 having polyester film with metallic coating may have a thickness of less than 200 microns, according to one embodiment, and has a thickness of approximately 150 microns, according to one example. The frame 42 may have a thickness in the range of 25-125 microns, according to one embodiment.

Referring to FIG. 6, a vanity assembly 20 used on a visor 10 is shown formed with the reflective film 40 molded onto the back side of the frame 42 according to an alternate embodiment. In this embodiment, the reflective film 40 reflects light from the front side as it passes through the substantially clear frame 42 and allows light from the light sources 28 to pass through the lighting portions 26 of the reflective film 40 first prior to passing through the substantially clear frame 42. Accordingly, it should be appreciated that the relative arrangement of the reflective film 40 and frame 42 may be switched to provide the mirror portion 24 and lighting portions 26.

Figure 7:
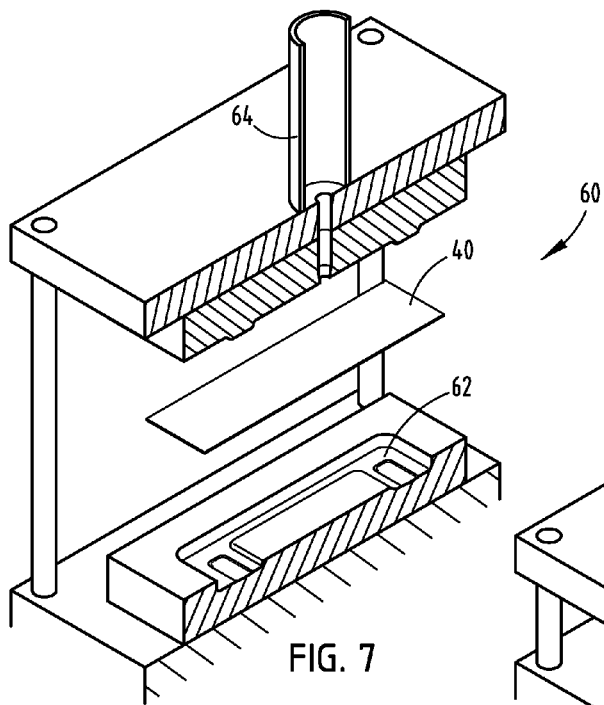
FIG. 7 is a cutaway exploded perspective view of a mold tool with a reflective film prior to molding the frame of the vanity assembly, according to one embodiment.
Figure 8:
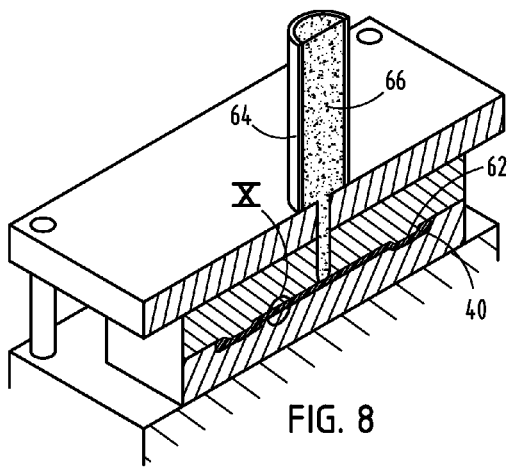
FIG. 8 is a cutaway perspective view of the mold tool with molten plastic injected into the cavity to form the molded base.
Figure 9:
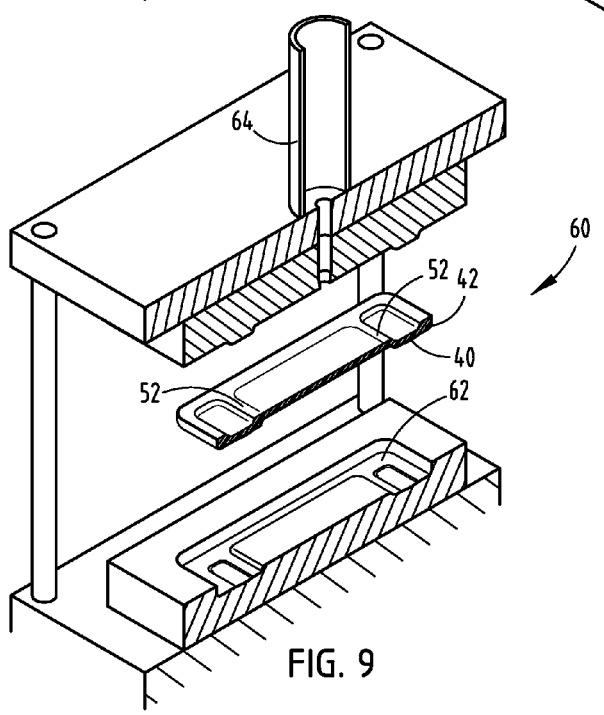
FIG. 9 is a cutaway exploded perspective view of the mold tool with the molded base ejected.
Figure 10:
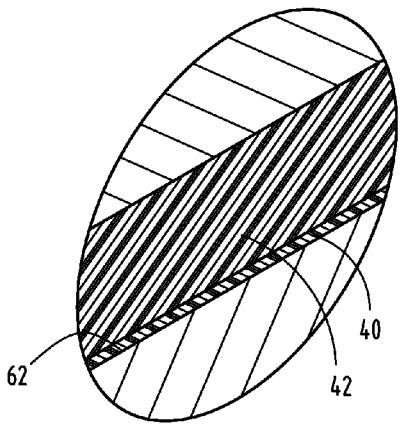
FIG. 10 is an enlarged view of section X of FIG. 8 further illustrating the molding of the frame and reflective film to form the base.

Referring to FIGS. 7-9, the molding of the base 22 of vanity assembly 20 is illustrated with a mold tool 60 according to one embodiment. The mold tool 60 is shown having a cavity 62 into which the reflective film 40 is disposed as shown in FIG. 7. The mold tool 60 also has a resin injection port 64 for injecting molten resin 66 into the mold cavity 62. As seen in FIG. 8, clear molten material is injected into the mold cavity 62 to fill the cavity 62 and mold the clear frame 42 to the reflective film 40. The mold cavity 62 is then opened as shown in FIG. 9 and the resulting molded base 22 made up of the reflective film 40 and frame 42 is removed from the mold. FIG. 10 illustrates a cross section of the final molded base 22 made up of reflective film 40 and frame 42. It should be appreciated that various sizes and rearrangements of the orientation of the reflective film 40 relative to the frame 42 may be provided with different shaped molds.

Accordingly, the vanity mirror and light assembly 20 advantageously provides for an easy to manufacture assembly that is aesthetically pleasing and made with few components that can easily be formed in a mold assembly for use on a vehicle sun visor 10. The vanity assembly 20 achieves a durable molded frame and reflective film base that is lightweight and integrally molded together with thin profile. While the vanity assembly 20 is shown and described herein as used on a vehicle sun visor 10, it should be appreciated that the vanity assembly 20 may be used independent of a vehicle sun visor 10 such as a standalone vanity assembly according to further embodiments.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vanity assembly comprising:
a frame;
a reflective film provided on the frame to define a mirror and a vanity light, wherein the reflective film is reflective on a front side and is partially transmissive to light directed from a back side toward the front side; and
a lighting device located behind the vanity light of the reflective film to provide vanity lighting passing through the vanity light.

2. The vanity assembly as defined in claim 1, wherein the reflective film comprises a polyester film with a metallic coating.

3. The vanity assembly as defined in claim 2, wherein the polyester film with metallic coating has a thickness of less than 200 microns.

4. The vanity assembly as defined in claim 1, wherein the assembly is installed on a vehicle visor.

5. The vanity assembly as defined in claim 1, wherein the frame and reflective film are molded together in a mold tool.

6. The vanity assembly as defined in claim 1, wherein the frame comprises a clear light transmissive material.

7. The vanity assembly as defined in claim 6, wherein the clear light transmissive material comprises a molded plastic.

8. The vanity assembly as defined in claim 6, wherein the reflective film is located rearward of the frame.

9. The vanity assembly as defined in claim 1 further comprising a rib provided in the frame and defining an outer perimeter of the vanity light through which the vanity lighting passes.

10. The vanity assembly as defined in claim 9, wherein the rib directs the lighting within the vanity light and prevents light from being emitted through the mirror.

* * * * *